C. D. Smith.
Imp<sup>d</sup> Journals of Axles or Shafts.
N° 73055      Patented Jan. 7, 1868.

Witnesses.
S. N. Piper
Lauritz Möller

Calvin D. Smith
by his attorney
R. H. Eddy

United States Patent Office.

CALVIN D. SMITH, OF BALDWINVILLE, MASSACHUSETTS.

Letters Patent No. 73,055, dated January 7, 1868.

IMPROVEMENT IN JOURNALS OF AXLES OR SHAFTS.

The Schedule referred to in these Letters Patent and making part of the same.

TO ALL PERSONS TO WHOM THESE PRESENTS SHALL COME:

Be it known that I, CALVIN D. SMITH, of Baldwinville, in the county of Worcester, and State of Massachusetts, have invented a new and useful Improvement in Journals of Axles or Shafts; and I do hereby declare the same to be fully described in the following specification, and represented in the accompanying drawings, of which—

Figure 2:
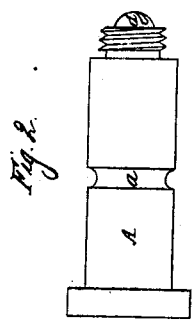
Figure 1:
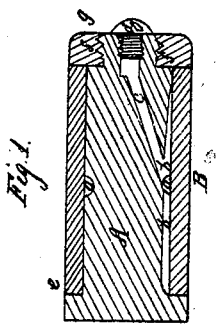
Figure 3:
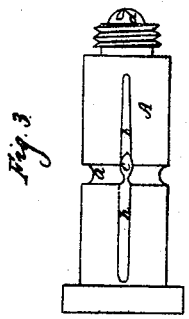

Figure 1 is a vertical section of a wheel-axle journal and its box or bearing as provided with my invention.
Figure 2 is a side elevation, and
Figure 3 an under side view of the journal.

In such drawings, A denotes the journal, and B the box or bearing.

In carrying out my invention, I first form on the journal, at or near its middle, a groove, $a$, to extend transversely around the journal, and to open into another groove, $b$, made longitudinally in the bottom of the journal. From the outer end of the journal I bore a hole or passage, $c$, inclining downward to the junction of the two grooves $a$ $b$, or into the latter groove; and I form in and at the outer end of the passage $c$ a female screw, to receive a screw-plug, $d$.

The journal may have a shoulder, $e$, to abut against one end of the box; and it may also have a screw, $f$, cut upon it, near its end, to receive a nut, $g$, to keep it in the box, or the latter on the journal.

In order to supply the box and journal with oil at any time, it may be poured from a feeder into the upper end of the passage $c$, when open. It will run through this passage into the grooves $a$ and $b$, and will rise in the groove $a$, and in the passage $c$, to a level with the lower part of the mouth of the said passage. Thus the passage $c$ and the grooves $a$ and $b$ constitute a reservoir to hold oil, and the groove $b$ serves to distribute the oil over the entire inner surface of the box while it may be in revolution.

I claim the arrangement of the inclined passage $c$, and the grooves $a$ and $b$, together and with the journal, as specified.

CALVIN D. SMITH.

Witnesses:
R. H. EDDY,
F. P. HALE, Jr.